United States Patent
Hessing et al.

(10) Patent No.: US 9,527,973 B2
(45) Date of Patent: Dec. 27, 2016

(54) CURABLE COMPOSITIONS AND MEMBRANES

(71) Applicant: Fujifilm Manufacturing Europe BV, Tilburg (NL)

(72) Inventors: Jacko Hessing, Tilburg (NL); Willem Van Baak, Tilburg (NL)

(73) Assignee: Fujifilm Manufacturing Europe BV (NL)

( * ) Notice: Subject to any disclaimer, the term of this patent is extended or adjusted under 35 U.S.C. 154(b) by 0 days.

(21) Appl. No.: 14/391,728

(22) PCT Filed: Mar. 22, 2013

(86) PCT No.: PCT/GB2013/050751
§ 371 (c)(1),
(2) Date: Oct. 10, 2014

(87) PCT Pub. No.: WO2013/153360
PCT Pub. Date: Oct. 17, 2013

(65) Prior Publication Data
US 2015/0105481 A1 Apr. 16, 2015

(30) Foreign Application Priority Data

Apr. 12, 2012 (GB) .................................. 1206415.0

(51) Int. Cl.
| | | |
|---|---|---|
| *C08J 5/22* | (2006.01) | |
| *C02F 1/469* | (2006.01) | |
| *C08F 220/38* | (2006.01) | |
| *B01D 67/00* | (2006.01) | |
| *B01D 69/02* | (2006.01) | |
| *B01D 69/10* | (2006.01) | |
| *B01D 71/76* | (2006.01) | |
| *B01D 69/12* | (2006.01) | |
| *B05D 3/00* | (2006.01) | |
| *B05D 3/06* | (2006.01) | |
| *B01D 61/44* | (2006.01) | |
| *B01D 61/48* | (2006.01) | |

(52) U.S. Cl.
CPC .......... *C08J 5/2231* (2013.01); *B01D 67/0006* (2013.01); *B01D 69/02* (2013.01); *B01D 69/10* (2013.01); *B01D 69/125* (2013.01); *B01D 71/76* (2013.01); *B05D 3/007* (2013.01); *B05D 3/067* (2013.01); *C02F 1/469* (2013.01); *C02F 1/4691* (2013.01); *C08F 220/38* (2013.01); *C08J 5/2268* (2013.01); *B01D 61/44* (2013.01); *B01D 61/48* (2013.01); *B01D 2323/30* (2013.01); *C02F 1/4693* (2013.01); *C02F 1/4695* (2013.01); *C08J 2333/00* (2013.01); *C08J 2333/26* (2013.01)

(58) Field of Classification Search
USPC .......................... 521/27; 429/492; 427/385.5
See application file for complete search history.

(56) References Cited

U.S. PATENT DOCUMENTS

| | | | | |
|---|---|---|---|---|
| 8,968,965 | B2 * | 3/2015 | Antheunis | B01D 61/44 204/157.6 |
| 2003/0149212 | A1 * | 8/2003 | Chang | C09K 8/512 526/317.1 |
| 2007/0204989 | A1 | 9/2007 | Tang | |
| 2010/0314115 | A1 * | 12/2010 | Moradi-Araghi | C09K 8/887 166/305.1 |
| 2011/0097645 | A1 * | 4/2011 | Van Baak | B01D 61/44 429/492 |
| 2012/0165420 | A1 * | 6/2012 | Bhikhi | B01D 67/0006 521/27 |

FOREIGN PATENT DOCUMENTS

| | | |
|---|---|---|
| WO | 2011073637 A1 | 6/2011 |
| WO | 2011073638 A1 | 6/2011 |
| WO | 2011073639 A1 | 6/2011 |
| WO | 2011073640 A1 | 6/2011 |
| WO | 2011073641 A1 | 6/2011 |
| WO | WO -2011/073641 A1 * | 6/2011 |

OTHER PUBLICATIONS

International Preliminary Report on Patentability dated Oct. 23, 2014, issued from corresponding PCT/GB2013/050751.

* cited by examiner

*Primary Examiner* — Peter D Mulcahy
*Assistant Examiner* — Henry Hu
(74) *Attorney, Agent, or Firm* — Banner & Witcoff, Ltd.

(57) ABSTRACT

A process for preparing a membrane comprising applying a curable composition to a porous support and curing the composition, wherein the composition comprises: a) a curable ionic compound; b) a first crosslinking agent; c) a second crosslinking agent; d) an inert solvent; and e) optionally a free radical initiator; wherein the second crosslinking agent has a melting point below 80° C. Also claimed are the compositions and membranes obtainable by using the process.

19 Claims, No Drawings

CURABLE COMPOSITIONS AND MEMBRANES

RELATED APPLICATION DATA

This application is a National Stage Application under 35 U.S.C. 371 of co-pending PCT application PCT/GB2013/050751 designating the United States and filed Mar. 22, 2013; which claims the benefit of GB application number 1206415.0 and filed Apr. 12, 2012 each of which are hereby incorporated by reference in their entireties.

This invention relates to a process for preparing membranes, to curable compositions suitable for use in the process and to membranes obtainable from the process. The membranes are particularly useful for water purification.

Water purification is the process of removing undesirable chemicals from contaminated water to make the water fit for drinking or for use in an application requiring ultra pure water.

Various techniques exist for water purification. The technique used depends to large extent on the impurities present in the water, the end use of the purified water and the manufacturing facilities and infrastructure available. The techniques include physical processes such as filtration and sedimentation, biological processes such as slow sand filters or activated sludge, chemical processes such as flocculation and chlorination and the use of electromagnetic radiation to kill bacteria.

Known water purification techniques include electrodeionization and electrodialysis. These use ionically charged membranes which selectively allow positive or negative ions to be removed from the water towards an oppositely charged electrode. This produces high purity, deionized water.

One of the problems with currently available membranes is that they allow significant amounts of water to pass from the retentate side of the membrane to the permeate side, along with the undesired ions. As a result the yield of purified water is reduced and the volume of the waste stream is increased. There is a need for ionically charged membranes having low water permeation properties and good permselectivity. Furthermore, such membranes desirably are strong, while at the same time being flexible. Ideally the membranes are inexpensive and capable of being mass-produced.

WO 2011/073639 describes the preparation of membranes from curable compositions. The crosslinking agents used in the Examples are solids having high melting points. Also the exemplified membranes mostly had a permselectivity below 90, with the very best being 91.0.

In order to improve the strength of a membrane one might decide to include more crosslinker in the curable composition. However the addition of more crosslinker implies a reduction in the amount of ionic curable component and therefore an undesirable decrease in membrane permselectivity. Furthermore, many crosslinking agents, e.g. those used in the Examples of WO 2011/073639, have low solubility and this imposes practical limitation on how much of the crosslinking agent can be included in the curable composition. It is possible to increase the amount of inert solvent present in a curable composition in order to ensure all curable components are dissolved. However, increasing the amount of inert solvent can in some cases create a weaker membrane having reduced permselectivity because solvent molecules occupy space during polymerisation and this space allows the resultant polymerised membrane to swell more in use. The present invention seeks to address the difficulty of providing strong, mass producible membranes which have both good permselectivity and low water permeation.

WO 2010/007399 describes the preparation of membranes for a different technical problem, that of producing electricity from the mixing of seawater and fresh water. The exemplified membranes were prepared by curing compositions comprising one or two crosslinking agents. The compositions comprising two crosslinking agents did not comprise ionic compounds or an inert solvent. Example CC4 contained two crosslinking agents, one of which had a melting point below 80° C. (SR259). However the resultant membranes had low permselectivities, e.g. Example CC4 had a permselectivity of only 84.0.

According to a first aspect of the present invention there is provided a process for preparing a membrane comprising applying a curable composition to a porous support and curing the composition, wherein the composition comprises:
   a) a curable ionic compound;
   b) a first crosslinking agent;
   c) a second crosslinking agent;
   d) an inert solvent; and
   e) optionally a free radical initiator;
wherein the second crosslinking agent has a melting point below 80° C.

Except where stated otherwise, references to "wt %" in this specification are relative to the total weight of the curable composition.

In this document (including its claims), the verb "comprise" and its conjugations is used in its non-limiting sense to mean that items following the word are included, but items not specifically mentioned are not excluded. In addition, reference to an element by the indefinite article "a" or "an" does not exclude the possibility that more than one of the elements is present, unless the context clearly requires that there be one and only one of the elements. The indefinite article "a" or "an" thus usually mean "at least one".

In this specification melting points are measured at a pressure of 100 kPa.

The curable ionic compound comprises an anionic group or a cationic group. Depending on the pH of the composition, these groups may be partially or wholly in salt form. The curable ionic compound may be rendered curable by the presence of one or more (preferably one and only one) ethylenically unsaturated group.

Preferred curable anionic compounds comprise an acidic group, for example a sulpho, carboxy and/or phosphato group. Preferably the curable anionic compound comprises a sulpho group. The preferred salts are lithium, ammonium, sodium and potassium salts and mixtures comprising two or more thereof.

Examples of curable ionic compounds comprising an anionic group include acrylic acid, beta carboxy ethyl acrylate, maleic acid, maleic acid anhydride, vinyl sulphonic acid, phosphonomethylated acrylamide, (2-carboxyethyl) acrylamide, 2-(meth)acrylamido-2-methylpropanesulfonic acid, mixtures comprising two or more thereof and salts thereof.

Preferred curable cationic compounds comprise a quaternary ammonium group. Examples of such compounds include (3-acrylamidopropyl)trimethylammonium chloride, 3-methacrylamidopropyl trimethyl ammonium chloride, (ar-vinylbenzyl) trimethylammonium chloride, (2-(methacryloyloxy)ethyl)trimethylammonium chloride, [3-(methacryloylamino)propyl] trimethyl ammonium chloride, (2-acrylamido-2-methylpropyl) trimethylammonium chloride, 3-acrylamido-3-methylbutyl trimethyl ammonium chloride, acryloylamino-2-hydroxypropyl trimethyl ammonium chloride, N-(2-aminoethyl)acrylamide trimethyl ammonium chloride and mixtures comprising two or more thereof.

Preferably the composition comprises 20 to 80 wt %, more preferably 25 to 70 wt %, especially 30 to 65 wt %, of component a).

Preferably the total amount of crosslinking agents present in the composition is from 10 wt % to 80 wt %, more preferably 15 wt % to 75 wt %, especially 17 to 70 wt %. In one preferred embodiment the total amount of crosslinking agents present in the composition is from 5 or 10 to 60 wt %, more preferably 15 to 50 wt % or 8 to 45 wt %, especially 17 to 40 wt %. For another preferred embodiment the total amount of crosslinking agents present in the composition is at least 17 wt %, more preferably at least 20 wt %, especially at least 20.5 wt %.

In contrast to the second crosslinking agent, the melting point of the first crosslinking agent is not critical to the present invention and may be 80° C., below 80° C. or above 80° C.

The crosslinking agents preferably each independently have two to six ethylenically unsaturated groups, more preferably two or three, especially two ethylenically unsaturated groups.

The preferred ethylenically unsaturated groups are (meth)acrylic groups, more preferably (meth)acrylate or (meth)acrylamide groups, especially acrylic groups, e.g. acrylate or acrylamide groups.

Most preferably the first crosslinking agent comprises acrylamide groups.

Preferably the molecular weight of the first crosslinking agent satisfies the equation:

(W×m)>molecular weight of the crosslinking agent wherein:
  m is the number of ethylenically unsaturated groups present in the crosslinking agent; and
  W is 120, more preferably 105, especially 90, more especially 85 or 77.

The lower values of W mentioned above are preferred because the resultant crosslinking agents crosslink more efficiently than when W is higher. Furthermore, crosslinking agents having the lower values of W mentioned above have lower molecular weights, leaving room for higher amounts of component a) having ionic groups and thereby achieving a lower electrical resistance for the resultant composite membrane for the same level of crosslinking.

The first crosslinking agent is preferably of the Formula (1):

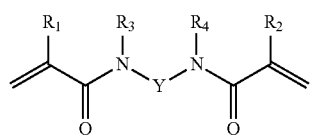

Formula (1)

wherein:
  $R_1$ and $R_2$ are each independently H or methyl;
  $R_3$ and $R_4$ are each independently H, alkyl, $R_3$ and $R_4$ together with the N groups to which they are attached and Y form an optionally substituted 6- or 7-membered ring; and Y is an optionally substituted and optionally interrupted alkylene group.

When $R_3$ or $R_4$ is alkyl it is preferably $C_{1-4}$-alkyl.

When $R_3$ and $R_4$ together with the N groups to which they are attached and Y form an optionally substituted 6- or 7-membered ring they preferably form a piperazine, homopiperazine or triazine ring.

The optional interruptions which may be present in Y are preferably ether or, more preferably, amino groups. Preferably Y is or comprises groups of the formula $-(C_nH_{2n})-$ wherein n is 1, 2 or 3.

Examples of crosslinking agents having from two to six acrylamide groups which may be used as the first crosslinking agent include N,N'-methylene bis(meth) acrylamide, N,N'-ethylene bis(meth)acrylamide, N,N'-propylene bis(meth)acrylamide, N,N'-butylene bis(meth)acrylamide, N,N'-(1,2-dihydroxyethylene) bis-(meth)acrylamide, 1,4-diacryloyl piperazine, 1,4-bis(acryloyl)homopiperazine, triacryloyl-tris(2-aminoethyl)amine, triacroyl diethylene triamine, tetra acryloyl triethylene tetramine, 1,3,5-triacryloyl-hexahydro-1,3,5-triazine and/or 1,3,5-trimethacryloylhexahydro-1,3,5-triazine. The term '(meth)' is an abbreviation meaning that the 'meth' is optional, e.g. N,N'-methylene bis(meth) acrylamide is an abbreviation for N,N'-methylene bis acrylamide and N,N'-methylene bis methacrylamide.

More preferably $R_3$ and $R_4$ are both H and Y is an optionally substituted C1-3-alkylene group or an optionally substituted $-(C_{1-3}$-alkylene-$NR_5-C_{1-3}$-alkylene)- group wherein $R_5$ is H or $C_{1-4}$-alkyl. Especially preferred crosslinking agents which may be used as component (i) are N,N'-methylene bis(meth) acrylamide, N,N'-ethylenebis(meth)acrylamide, N,N'-propylenebis(meth)acrylamide, N,N'-(1,2-dihydroxyethylene) bis-(meth)acrylamide, triacryloyl-tris(2-aminoethyl)amine and triacroyl diethylene triamine.

Component b) consists of one or more than one crosslinking agent (preferably one crosslinking agent or 2 to 5 crosslinking agents). Preferably the composition comprises 3 to 35 wt %, more preferably 5 to 25 wt %, especially 5 to 22 wt % of component b).

The second crosslinking agent preferably has a melting point below 60° C., more preferably below 40° C. (the second crosslinking agent is not the same crosslinking agent as the first crosslinking agent, i.e. is different from the first crosslinking agent). Thus in order to provide components b) and c), one may optionally include at least two crosslinking agents in the curable composition, wherein at least one of said crosslinking agents has a melting point below 80° C.

Preferably the second crosslinking agent is liquid when the curable composition is applied to the support. In liquid form the second crosslinking agent may function as a reactive diluent. This makes it possible to reduce the amount of inert solvent (component d)) present in the curable composition and in some cases this improves the properties of the resultant membrane, e.g. by lowering swelling and reducing water permeability.

Preferably the second crosslinking agent comprises one or more hydrophilic groups, for example one or more groups selected from hydroxy groups and alkylene oxide groups (e.g. methylene oxide or ethylene oxide groups).

The second crosslinking agent preferably has an MW (weight average molecular weight) of less than 1000n wherein n is 2 to 5 and is the number of ethylenically unsaturated groups present in the second crosslinking agent. More preferably the MW of the second crosslinking agent is less than 500n, especially less than 400n, more especially less than 300n, wherein n is as hereinbefore defined.

Examples of crosslinking agents having a melting point below 80° C. include tetraethylene glycol diacrylate, polyethyleneglycol (200) diacrylate, polyethyleneglycol (400) diacrylate, polyethyleneglycol (600) diacrylate, polyethyleneglycol (2000) diacrylate, dipropylene glycol diacrylate, tripropylene glycol diacrylate, propoxylated ethylene glycol diacrylate, ethoxylated (3) bisphenol A diacrylate, ethoxylated (10) bisphenol A diacrylate, ethoxylated (30) bisphenol A diacrylate, tricyclodecane dimethanol diacrylate, ethoxylated (9) trimethylolpropane triacrylate, ethoxylated (15) trimethylolpropane triacrylate, ethoxylated (20) trimethylolpropane triacrylate, propoxylated (3) trimethylolpropane triacrylate, pentaerythriol triacrylate, pentaerythritol tetraacrylate, ethoxylated (4) pentaerythritol tetraacrylate, dipentaerythritol pentaacrylate, and the methacrylic versions of the foregoing.

Component c) consists of one or more than one crosslinking agent having a melting point below 80° C. (e.g. one crosslinking agent or 2 to 5 crosslinking agents, each having a melting point below 80° C.). Preferably the composition comprises 2 to 25 wt %, more preferably 3 to 20 wt %, of component c).

In one embodiment the composition comprises less than 10 wt %, more preferably less than 5 wt %, of ethylenically unsaturated compounds other than components a), b) and c). In a preferred embodiment the composition is free from ethylenically unsaturated compounds other than components a), b) and c).

The inert solvent may be any solvent which does not copolymerise with component a), b) or c) during the process. An inert solvent comprising an inert organic solvent and water is advantageous, especially where some or all of the inert organic solvent is water-miscible. The water is useful for dissolving component a) and the inert organic solvent is useful for dissolving organic components of the curable composition.

The inclusion of an inert solvent can be useful for reducing the viscosity and/or surface tension of the composition, making the manufacturing process easier in some respects.

In one embodiment the inert solvent comprises at least 50 wt % water, more preferably at least 70 wt % water, relative to the total amount of inert solvent. Thus the inert solvent preferably comprises less than 30 wt % inert organic solvent and any remaining inert solvent is water. In one embodiment the composition is free from inert organic solvents, providing environmental advantages due to the complete absence of volatile organic inert solvents.

Preferably the composition comprises 5 to 45 wt %, more preferably 6 to 40 wt %, most preferably 10 to 35 wt %, especially 10 to 25 wt % of component d).

In one embodiment the curable composition comprises less than 25 wt %, more preferably less than 21.5 wt %, of component d).

Preferably just enough inert solvent is used to dissolve the components of the composition, e.g. the amount of solvent is no more than 5 wt % more than is necessary to dissolve the rest of the curable composition at the temperature at which the curable composition is applied to the porous support. This has the advantage of enhancing permselectivity. The inert organic solvent is optionally a single organic solvent or a combination of two or more inert organic solvents.

Preferred inert organic solvents include $C_{1-4}$ alcohols (e.g. mono ols such as methanol, ethanol and propan-2-ol); diols (e.g. ethylene glycol and propylene glycol); triols (e.g. glycerol)); carbonates (e.g. ethylene carbonate, propylene carbonate, dimethyl carbonate, diethyl carbonate, di-t-butyl dicarbonate and glycerin carbonate); dimethyl formamide; acetone; N-methyl-2-pyrrolidinone; and mixtures comprising two or more of the foregoing. A particularly preferred organic solvent is propan-2-ol.

In one embodiment the inert organic solvent has a low boiling point, e.g. a boiling point below 100° C. Inert solvents having a low boiling point can be easily removed by evaporation, avoiding the need for a washing step for removal of the solvent.

In one embodiment the composition is free from free radical initiators. When the composition is free from free radical initiators it may be cured using electron beam radiation.

Preferably the composition comprises 0 or 0.01 to 10 wt %, more preferably 0.05 to 5 wt %, especially 0.1 to 2 wt %, of component e). The preferred free radical initiator is a photoinitiator.

The curable composition may comprise one or more than one free radical initiator as component e).

For acrylamides, diacrylamides, and higher-acrylamides, type I photoinitiators are preferred. Examples of type I photoinitiators are as described in WO 2007/018425, page 14, line 23 to page 15, line 26, which are incorporated herein by reference thereto. Especially preferred photoinitiators include alpha-hydroxyalkylphenones, e.g. 2-hydroxy-2-methyl-1-phenyl propan-1-one and 2-hydroxy-2-methyl-1-(4-tert-butyl-) phenylpropan-1-one, and acylphosphine oxides, e.g. 2,4,6-trimethylbenzoyl-diphenylphosphine oxide, and bis(2,4,6-trimethylbenzoyl)-phenylphosphine oxide.

When a free radical initiator is present in the composition, preferably a polymerization inhibitor is also included (e.g. in an amount of below 2 wt %). This is useful to prevent premature curing of the composition during, for example, storage. Suitable inhibitors include hydroquinone, hydroquinone mono methyl ether, 2,6-di-t-butyl-4-methylphenol, 4-t-butyl-catechol, phenothiazine, 4-oxo-2,2,6,6-tetramethyl-1-piperidinoloxy, free radical, 4-hydroxy-2,2,6,6-tetramethyl-1-piperidinoloxy, free radical, 2,6-dinitro-sec-butylphenol, tris(N-nitroso-N-phenylhydroxylamine) aluminum salt, Omnistab™ IN 510 and mixtures comprising two or more thereof.

Preferably the composition further comprises f) a non-curable salt, especially when one or more of the components of the composition comprises an amide group. The non-curable salt can be any salt which is not capable of forming a covalent bond with components a), b) and c) during curing of the composition. The non-curable salt preferably has a solubility in water at 25° C. of at least 250 g/L, more preferably at least 400 g/L. Preferred non-curable salts are inorganic salts, for example inorganic lithium, sodium, potassium, ammonium, magnesium and calcium salts and mixtures comprising two or more such salts.

Preferred non-curable salts include lithium chloride, lithium bromide, lithium nitrate, lithium iodide, lithium chlorate, lithium thiocyanate, lithium hydroxide, ammonium thiocyanate, ammonium chloride, ammonium iodide, ammonium nitrate, sodium chloride, sodium bromide, sodium nitrate, sodium thiocyanate, calcium nitrate, calcium thiocyanate, calcium bromide, magnesium chloride, magnesium bromide, magnesium nitrate, magnesium thiocyanate, potassium thiocyanate, potassium chlorate, and mixtures comprising two or more such salts. Most preferred are lithium chloride, lithium bromide, lithium nitrate, ammonium nitrate, sodium nitrate, calcium nitrate, lithium hydroxide and mixtures comprising two or more such salts.

The non-curable salts are believed to help to dissolve components of the curable composition, possibly by disturbing the intermolecular hydrogen bridges of any amide groups which may be present in such components. When adjustment of pH is desired a hydroxide may be used as non-curable salt.

Preferably the composition comprises 0 to 50 wt %, more preferably 4 to 40 wt %, especially 5 to 30 wt %, of component f).

Bearing in mind the foregoing, in a preferred process according to the present invention:
(i) the first crosslinking agent comprises at least two acrylamide groups;
(ii) the second crosslinking agent comprises at least two acrylic groups;
(iii) the composition comprises less than 25 wt % of component d)
(iv) the total amount of crosslinking agents present in the composition is at least 17 wt %;
(v) optionally the composition further comprises an inorganic salt; and
(vi) optionally the inert solvent comprises less than 30 wt % inert organic solvent and any remaining inert solvent is water.

The curable composition may contain other components, for example curable compounds which are free from ionic groups (e.g. methyl (meth)acrylate, N-(2-hydroxyethyl) acrylamide etc.), acids, pH controllers, preservatives, viscosity modifiers, stabilisers, dispersing agents, antifoam agents, organic/inorganic salts, anionic, cationic, non-ionic and/or amphoteric surfactants, buffers and the like.

Curing rates may be increased by including an amine synergist in the curable composition. Suitable amine synergists include, for example, free alkyl amines, e.g. triethylamine or triethanol amine; aromatic amines, e.g. 2-ethyl-hexyl-4-dimethylaminobenzoate, ethyl-4-dimethylaminobenzoate and also polymeric amines as polyallylamine and its derivatives.

When used the amount of amine synergists is preferably from 0.1 to 10 wt. %, more preferably from 0.3 to 3 wt %, based on the total weight of the composition.

The preferred pH for the composition depends to some extent on whether the curable ionic compound is in the free acid or salt form and whether the ionic group is anionic or cationic. Preferably the composition has a pH of 0.8 to 12.

When the curable ionic compound carries an anionic group and is partly in the free acid form the composition preferably has a pH of 1.1 to 5, more preferably 1.1 to 2.5. When the curable ionic compound carries an anionic group and is at least 95% in the salt form the composition preferably has a pH of 2 to 10, more preferably 3 to 8, especially 4 to 7 and more especially 4 to 5.

When the curable ionic compound carries a cationic group the composition preferably has a pH of 2 to 10, more preferably 4 to 8.

In view of the foregoing a particularly preferred curable composition comprises:
i) 20 to 80 wt % (more preferably 30 to 65 wt %) of component a);
ii) 3 to 35 wt % (more preferably 5 to 25 wt %) of component b);
iii) 2 to 25 wt % (more preferably 3 to 20 wt %) of component c);
iv) 5 to 45 wt % (more preferably 10 to 35 wt %) of component d);
v) 0 to 10 wt % of component e) (more preferably 0.01 to 10 wt % photoinitiator); and
vi) 0 to 50 wt % (more preferably 4 to 40 wt %), of component f);
wherein component c) has a melting point below 80° C. (more preferably below 60° C., especially below 40° C.).

This composition forms a second aspect of the present invention. Preferences for this composition are as described above in relation to the process of the present invention.

Preferably the curable composition is free from, or substantially free from, methacrylic compounds (e.g. methacrylate and methacrylamide compounds), which are free from acrylic groups and comprise one or more methacrylic groups.

By "substantially free from" we mean contains less than 5 wt %, more preferably less than 2 wt %, especially less than 1 wt %. Thus the composition preferably comprises less than 5 wt %, more preferably less than 2 wt %, especially less than 1 wt % methacrylic compounds.

The preferences for components a) to f) of the curable composition according to the second aspect of the present invention are as described above in relation to the first aspect of the present invention.

In order to provide features ii) and iii) of the curable composition, the curable composition may comprise 5 to 60 wt % of crosslinking agents wherein the content of crosslinking agent(s) having a melting point below 80° C. is 2 to 25 wt % relative to the weight of the curable composition. In this case, the present invention provides a curable composition comprising the following ingredients and the use of such a composition in the process according to the first aspect of the present invention:
1) 20 to 80 wt % (more preferably 30 to 65 wt %) of curable ionic compound(s);
2) 5 to 60 wt % (more preferably 8 to 45 wt %) of crosslinking agents;
3) 5 to 45 wt % of inert solvent(s); and
4) 0 to 10 wt % (more preferably 10 to 35 wt %) of free radical initiator(s);
wherein the composition comprises at least two crosslinking agents and the content of crosslinking agent(s) having a melting point below 80° C. is 2 to 25 wt % (more preferably 3 to 20 wt %).

Also the composition described immediately above optionally further comprises 0 to 50 wt % (more preferably 4 to 40 wt %) of non-curable salt(s).

The preferred curable ionic compound(s), crosslinking agents, inert solvent(s), free radical initiators and non-curable salts are as described above in relation to the first aspect of the present invention.

Preferably the curable composition is free from, or substantially free from, divinyl benzene. Thus the composition preferably comprises less than 5 wt %, more preferably less than 2 wt %, especially less than 1 wt % divinyl benzene.

Preferably the curable composition is free from, or substantially free from, styrene. Thus the composition preferably comprises less than 5 wt %, more preferably less than 2 wt %, especially less than 1 wt % styrene.

Preferably the curable composition is free from, or substantially free from, dyes and pigments. This is because there is no need to include dyes or pigments in the composition. Thus the composition preferably comprises less than 5 wt %, more preferably less than 2 wt %, especially less than 1 wt % dyes and pigments.

Thus the preferred curable composition is free from, or substantially free from, divinyl benzene, dyes, pigments, styrene and methacrylic compounds.

Hitherto membranes have often been made in slow and energy-intensive processes, often having many stages. The present invention enables membranes to be prepared in a simple process that may be run continuously for long periods of time to mass produce membranes relatively cheaply.

The membrane is preferably a cation or an anion exchange membrane.

The thickness of the membrane, including the porous support, is preferably less than 250 µm, more preferably between 5 and 200 µm, most preferably between 10 and 150 µm.

Preferably the membrane has an ion exchange capacity of at least 0.1 meq/g, more preferably of at least 0.3 meq/g, especially more than 0.6 meq/g, more especially more than 1.0 meq/g, based on the total dry weight of the membrane (including the porous support). Ion exchange capacity may be measured by titration as described by Djugolecki et al, J. of Membrane Science, 319 (2008) on page 217.

Preferably the membrane has a permselectivity for small cations (e.g. $Na^+$) or anions (e.g. $Cl^-$) above 90%, more preferably above 95%.

Preferably the membrane has an electrical resistance less than 15 ohm·$cm^2$, more preferably less than 10 ohm·$cm^2$, most preferably less than 8 ohm·$cm^2$. For certain applications a high electrical resistance may be acceptable especially when the permselectivity is very high, e.g. higher than 95%, and the water permeation low, for example for processes that operate with low conductive streams such as systems used for producing ultrapure water and/or drinking water. The electrical resistance may be determined by the method described below in the examples section.

Preferably the membrane exhibits a swelling in water of less than 100%, more preferably less than 75%, most preferably less than 60%. The degree of swelling can be controlled by the amount of crosslinking agents, the amount of non-curable compounds and by selecting appropriate parameters in the curing step and further by the properties of the porous support. Electrical resistance, permselectivity and % swelling in water may be measured by the methods described by Djugolecki et al, J. of Membrane Science, 319 (2008) on pages 217-218.

Typically the ion exchange membrane is substantially non-porous e.g. the pores are smaller than the detection limit of a standard Scanning Electron Microscope (SEM). Thus using a Jeol JSM-6335F Field Emission SEM (applying an accelerating voltage of 2 kV, working distance 4 mm, aperture 4, sample coated with Pt with a thickness of 1.5 nm, magnification 100,000×, 3° tilted view) the average pore size is generally smaller than 5 nm, preferably smaller than 2 nm.

The resultant membrane preferably has a low water permeability so that (hydrated) ions may pass through the membrane and (free) water molecules do not pass through the membrane. Preferably the membrane's water permeability is lower than $1 \cdot 10^{-9}$ $m^3/m^2 \cdot s \cdot kPa$, more preferably lower than $1 \cdot 10^{-10}$ $m^3/m^2 \cdot s \cdot kPa$, most preferably lower than $5 \cdot 10^{-11}$ $m^3/m^2 \cdot s \cdot kPa$, especially lower than $3 \cdot 10^{-11}$ $m^3/m^2 \cdot s \cdot kPa$.

During the curing process, the curable composition may form a layer on top of the porous support, or it may permeate wholly or partially into the pores of the support thereby forming an impregnated composite membrane. The curable composition may also be applied to both sides of the porous support to achieve a symmetrical composite membrane. In a preferred embodiment the porous support is saturated with the composition and the saturated support is cured by EB or UV irradiation.

The process of the present invention may contain further steps if desired, for example washing and/or drying the resultant membrane.

Before applying the curable composition to the surface of the support, the support may be subjected to a corona discharge treatment, plasma glow discharge treatment, flame treatment, ultraviolet light irradiation treatment, chemical treatment or the like, e.g. for the purpose of improving its wettability and the adhesiveness.

The support may also be treated to modify its surface energy, e.g. to values above 45 mN/m, preferably above 55 mN/m.

While it is possible to prepare the membrane on a batch basis using a stationary support, to gain full advantage of the invention it is much preferred to prepare the membrane on a continuous basis using a moving support. The support may be in the form of a roll which is unwound continuously or the support may rest on a continuously driven belt (or a combination of these methods). Using such techniques the curable composition can be applied to the support on a continuous basis or it can be applied on a large batch basis.

The curable composition may be applied to the support by any suitable method, for example by curtain coating, blade coating, air-knife coating, knife-over-roll coating, slide coating, nip roll coating, forward roll coating, reverse roll coating, micro-roll coating, dip coating, foulard coating, kiss coating, rod bar coating or spray coating. The curable composition typically forms a continuous film layer on the porous support. The coating of multiple layers can be done simultaneously or consecutively. When coating multiple layers, the curable compositions may be the same or different. For simultaneous coating of multiple layers, curtain coating, slide coating and slot die coating are preferred. The curable composition(s) may be applied to one side of the support or to both sides of the support.

In one embodiment at least two of the curable compositions, which may be the same or different, are applied to the support, e.g. simultaneously or consecutively. The curable compositions may be applied to the same side of the support or to different sides. Thus the application step may be performed more than once, either with or without curing being performed between each application. When applied to different sides the resultant composite membrane may be symmetrical or asymmetrical and the layers of curable composition may have the same or different thicknesses. When applied to the same side a composite membrane may be formed comprising at least one top layer and at least one bottom layer that is closer to the support than the top layer. In this embodiment the top layer and bottom layer, together with any intervening layers, constitute the membrane and the porous support provides strength to the resultant composite membrane.

Thus in a preferred process, the curable composition is applied continuously to a moving porous support, more preferably by means of a manufacturing unit comprising one or more curable composition application station(s), one or more irradiation source(s) for curing the composition, a membrane collecting station and a means for moving the support from the curable composition application station(s) to the irradiation source(s) and to the membrane collecting station.

The curable composition application station(s) may be located at an upstream position relative to the irradiation source(s) and the irradiation source(s) is/are located at an upstream position relative to the membrane collecting station.

In order to produce a sufficiently flowable curable composition for application by a high speed coating machine, it is preferred that the curable composition has a viscosity below 5000 mPa·s when measured at 35° C., more preferably from 1 to 1500 mPa·s when measured at 35° C. Most preferably the viscosity of the curable composition is from 2 to 500 mPa·s when measured at 35° C. For coating methods such as slide bead coating the preferred viscosity is from 2 to 150 mPa·s when measured at 35° C.

With suitable coating techniques, the curable composition may be applied to a support moving at a speed of over 5 m/min, preferably over 10 m/min, more preferably over 15 m/min, e.g. more than 20 m/min, or even higher speeds, such as 60 m/min, 120 m/min or up to 400 m/min can be reached.

Curing is preferably performed by radical polymerisation, preferably using electromagnetic radiation. The source of radiation may be any source which provides the wavelength and intensity of radiation necessary to cure the composition. A typical example of a UV light source for curing is a D-bulb with an output of 600 Watts/inch (240 W/cm) as supplied by Fusion UV Systems. Alternatives are the V-bulb and the H-bulb from the same supplier.

When no photoinitiator is included in the curable composition, the composition can be cured by electron-beam exposure, e.g. using an exposure of 50 to 300 keV. Curing can also be achieved by plasma or corona exposure During curing the components a), b) and c) polymerise to form a polymeric membrane. The curing may be brought about by any suitable means, e.g. by irradiation and/or heating. Preferably curing occurs sufficiently rapidly to form a membrane within 30 seconds. If desired further curing may be applied subsequently to finish off, although generally this is not necessary.

The curing is preferably achieved thermally (e.g. by irradiating with infrared light) or, more preferably, by irradiating the composition with ultraviolet light or an electron beam.

For thermal curing the curable composition preferably comprises one or more thermally reactive free radical initiators. Examples of thermally reactive free radical initiators include organic peroxides, e.g. ethyl peroxide and/or benzyl peroxide; hydroperoxides, e.g. methyl hydroperoxide, acyloins, e.g. benzoin; certain azo compounds, e.g. α,α'-azobisisobutyronitrile and/or γ,γ'-azobis(γ-cyanovaleric acid); persulfates; peracetates, e.g. methyl peracetate and/or tert-butyl peracetate; peroxalates, e.g. dimethyl peroxalate and/or di(tert-butyl) peroxalate; disulfides, e.g. dimethyl thiuram disulfide and ketone peroxides, e.g. methyl ethyl ketone peroxide. Temperatures in the range of from about 30° C. to about 150° C. are generally employed for infrared curing. More often, temperatures in the range of from about 40° C. to about 110° C. are used.

Preferably curing of the composition begins within 3 minutes, more preferably within 60 seconds, after the composition has been applied to the support.

Preferably the curing is achieved by irradiating the composition for less than 30 seconds, more preferably less than 10 seconds, especially less than 3 seconds, more especially less than 2 seconds. In a continuous process the irradiation occurs continuously and the speed at which the composition moves through the beam of irradiation is mainly what determines the time period of curing. The exposure time is determined by the irradiation time by the concentrated beam; stray 'light' generally is too weak to have a significant effect.

Preferably the curing uses ultraviolet light. Suitable wavelengths are for instance UV-A (390 to 320 nm), UV-B (320 to 280 nm), UV-C (280 to 200 nm) and UV-V (445 to 395 nm), provided the wavelength matches with the absorbing wavelength of any photoinitiator included in the curable composition.

Suitable sources of ultraviolet light are mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapour type. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized. The exposure intensity is one of the parameters that can be used to control the extent of curing which influences the final structure of the membrane. Preferably the exposure dose is at least 40 mJ/cm$^2$, more preferably between 40 and 1500 mJ/cm$^2$, most preferably between 70 and 900 mJ/cm$^2$ as measured using a High Energy UV Radiometer (UV PowerMap™ from EIT, Inc) in the UV-A and UV-B range indicated by the apparatus.

To reach the desired exposure dose at high coating speeds, more than one UV lamp may be used, so that the curable composition is irradiated more than once.

Photoinitiators may be included in the curable composition, as mentioned above, and are usually required when curing uses UV or visible light radiation.

As examples of porous supports there may be mentioned woven and non-woven synthetic fabrics and extruded films. Examples include wetlaid and drylaid non-woven material, spunbond and meltblown fabrics and nanofiber webs made from, e.g. polyethylene, polypropylene, polyacrylonitrile, polyvinyl chloride, polyester, polyamide, and copolymers thereof. Porous supports may also be porous membranes, e.g. polysulfone, polyethersulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl 1-pentene), polyinylidene fluoride, polytetrafluoroethylene, polyhexafluoropropylene and polychlorotrifluoroethylene membranes.

Various porous supports are available commercially, e.g. from Freudenberg Filtration Technologies (Novatexx materials) and Sefar AG.

According to a third aspect of the present invention there is provided a membrane obtainable by or obtained by the process of the present invention.

According to a fourth aspect of the present invention there is provided use of a membrane according to the third aspect of the present invention for water purification.

Although the membranes of the present invention are primarily intended for use in water purification (e.g. by electrodeionisation or electrodialysis), they may also be used for other purposes requiring membranes having ionic groups, e.g. continuous electrodeionisation (CEDI), electrodialysis reversal (EDR) and capacitive deionisation used in e.g. flow through capacitors (FTC), Donnan or diffusion dialysis (DD) for e.g. fluoride removal or the recovery of acids, pervaporation for dehydration of organic solvents, fuel cells, electrolysis (EL) of water or for chlor-alkali production, and reverse electrodialysis (RED).

According to a fifth aspect of the present invention there is provided an electrodialysis or reverse electrodialysis unit, an electrodeionization module, a flow through capacitor, a fuel cell, a diffusion dialysis apparatus, a membrane distillation module or a membrane electrode assembly, comprising one or more membranes according to the third aspect of the present invention. The electrodeionization module is preferably a continuous electrodeionization module.

Preferably the electrodialysis or reverse electrodialysis unit or the electrodeionization module or the flow through capacitor comprises at least one anode, at least one cathode and two or more membranes according to the third aspect of the present invention. Further the unit preferably comprises an inlet for providing a flow of relatively salty water along a first side of a membrane according to the present invention and an inlet for providing a less salty flow water along a second side of the membrane such that ions pass from the first side to the second side of the membrane. Preferably the two or more membranes of the unit comprise a membrane according to the third aspect of the present invention having anionic groups and a further membrane having cationic groups.

In a preferred embodiment the unit comprises at least 1, more preferably at least 5, e.g. 36, 64, 200, 600 or up to 1500, membrane pairs according to the third aspect of the present invention, the number of membranes being dependent on the application. The membrane may for instance be used in a plate-and-frame or stacked-disk configuration or in a spiral-wound design. Alternatively, a continuous first membrane according to the present invention having anionic groups may be folded in a concertina (or zigzag) manner and a second membrane having cationic groups (i.e. of opposite charge to the first membrane) may be inserted between the folds to form a plurality of channels along which fluid may pass and having alternate anionic and cationic membranes as side walls.

The invention will now be illustrated with non-limiting examples where all parts and percentages are by weight unless specified otherwise.

In the examples the following properties were measured by the methods described below.

General Test Methods

Permselectivity ($\alpha$ (%)) was measured by using a static membrane potential measurement. Two cells are separated by the membrane under investigation. Prior to the measurement the membrane was equilibrated in a 0.05 M KCl solution for 16 hours. Two streams having different KCl concentrations were passed through cells on opposite sides of the membranes under investigation. One stream had a concentration of 0.05M KCl (from Sigma Aldrich, min. 99.0% purity) and the other stream was 0.5 M KCl. The flow rate of both streams was 0.5 L/min (using a Cole Parmer Masterflex console drive (77521-47) with easy load II model 77200-62 gear pumps). Two Ag/AgCl reference electrodes type 6.0750.100 (from Metrohm AG, Switzerland) filled with 3M KCl were connected to Haber-Luggin capillary tubes that were inserted in each cell and were used to measure the potential difference over the membrane. The effective membrane area was 9.62 cm$^2$ and the temperature was 21° C.

When a steady state was reached, the membrane potential was measured ($\Delta V$meas)

The permselectivity ($\alpha$ (%)) of the membrane was calculated according the formula:

$$\alpha\ (\%) = \Delta V\text{meas}/\Delta V\text{theor} * 100\%.$$

The theoretical membrane potential ($\Delta V$theor) is the potential for a 100% permselective membrane as calculated using the Nernst equation.

The measured values were corrected for the (constant) potential deviation between the two reference electrodes.

Electrical resistance ER (ohm·cm$^2$) was measured by the method described by Djugolecki et al, J. of Membrane Science, 319 (2008) on page 217-218 with the following modifications:

the auxiliary membranes were CMX and AMX from Tokuyama Soda, Japan;

the capillaries as well as the Ag/AgCl references electrodes (Metrohm type 6.0750.100) contained 3M KCl;

the calibration liquid and the liquid in compartment 3 and 4 was 2.0 M NaCl, compartments 2 and 5 contained 0.5 M NaCl;

the effective membrane area was 9.62 cm$^2$;

the distance between the capillaries was 9.5 mm;

the measuring temperature was 24.7° C.;

a Cole Parmer Masterflex console drive (77521-47) with easy load II model 77200-62 gear pumps was used for all compartments;

the flowrate of each stream was 475 ml/min controlled by Porter Instruent flowmeters (type 150AV-B250-4RVS) and Cole Parmer flowmeters (type G-30217-90).

Water permeability is determined as follows.

A membrane sample at least 21×21 cm in size was conditioned for 16 hours in a 0.1 M NaCl (20.45 g/3.500 L) solution.

The membrane was clamped between a perforated nylon support and a nylon ring forming an effective membrane surface of 333 cm$^2$.

On the unsupported side of the membrane a solution of 0.1 M NaCl was circulated and on the supported side a solution of 0.7 M NaCl (143.18 g/3,500 L). Circulation was achieved by a Masterflex console drive (77521-47) with easy load II model 77200-62 gear pumps at a rate of 0.5 L/min.

In the compartment filled with the 0.1M NaCl solution a light overpressure was created by connecting via a tube an open vessel with the liquid level 40 cm higher than the top side of the compartment. To the compartment filled with the 0.7M NaCl solution was connected a Bronkhorst LIQUI-FLOW® L13 digital mass flow meter that was positioned 10 cm below the bottom of the compartment. The water transport over the membrane was obtained by multiplying the flow meter value by a correction factor of 1.07.

INGREDIENTS

MBA is N,N'-methylene bisacrylamide from Sigma Aldrich. This compound has a mpt>80° C.

BAP is 1,4-bis(acryloyl)piperazine from Sigma Aldrich. This compound has a mpt>80° C.

AMPS is 2-Acryloylamido-2-methylpropanesulfonic acid from Hang-Zhou (China).

DMAPAA-Q is a 75 wt % aqueous solution of 3-acrylamidopropyl-trimethylammonium chloride from Kohjin.

SR259 is polyethylene glycol (200) diacrylate from Sartomer. Mpt<25° C.

HEAA is N-(2-hydroxyethyl)acrylamide from Sigma Aldrich.

SR344 is polyethylene glycol (400) diacrylate from Sartomer. Mpt<25° C.

SR399 is dipentaerythritol pentaacrylate from Sartomer. Mpt<25° C.

SR494 is ethoxylated (4) pentaerythritol tetraacrylate from Sartomer. Mpt<25° C.

CD9038 is ethoxylated (30) bisphenol A diacrylate from Sartomer. Mpt<25° C.
Darocur™ 1173 is 2-hydroxy-2-methyl-1-phenyl-propan-1-one, a photoinitiator from BASF Resins, Paint & Coatings.
MeHQ is hydroquinone monomethyl ether, a polymerisation inhibitor from Merck.
IPA is 2-propanol from Shell (an inert organic solvent).
$LiNO_3$ is lithium nitrate from Sigma Aldrich.
$LiOH.H_2O$ is lithium hydroxide monohydrate from Chemetall.
Viledon® Novatexx 2226-14E is a nonwoven polyolefine porous substrate from Freudenberg Filtration Technologies.
PW is pure water (an inert solvent).
Surfactant was a polyether siloxane from Evonik.

EXAMPLES 1 TO 19 AND COMPARATIVE EXAMPLES 1 TO 11

The curable compositions of Examples 1 to 19 (Ex 1 to Ex 19) and comparative Examples 1 to 11 (CE1 to CE11) were prepared by mixing the ingredients indicated in Tables 1 to 4 (all amounts are wt % relative to the total weight of curable composition).

The resultant curable compositions (described in Tables 1 to 5) were applied to an aluminium underground carrier using a 150 μm wire wound bar, at a speed of approximately 5 m/min, by hand, followed by application to a non-woven support (Viledon® Novatexx™ 2226-14E). The non-woven support was completely soaked with the composition. Subsequently the composition was leveled using a 4 micrometer wire wound rod coater. The temperature of the curable compositions was about 50° C. during coating and somewhat lower just before curing.

A membrane was prepared by curing the coated support using a Light Hammer LH10 from Fusion UV Systems fitted with a D-bulb working at 100% intensity with a speed of 30 m/min (single pass). The exposure time was 0.47 seconds.

After curing, the membrane was stored in a 0.1 M NaCl solution for at least 12 hours.

TABLE 1

| Component | name | CE 1 | Ex 1 | Ex 2 | Ex 3 | Ex 4 | Ex 5 | CE 2 |
|---|---|---|---|---|---|---|---|---|
| a) | AMPS | 49.10 | 49.10 | 49.10 | 49.10 | 49.10 | 49.10 | 49.10 |
| b) | MBA | 11.58 | 11.58 | 11.58 | 11.58 | 11.58 | 11.58 | 11.58 |
| c) | SR259 | 0 | 13.01 | 0 | 0 | 0 | 0 | 0 |
|  | SR344 | 0 | 0 | 13.01 | 0 | 0 | 0 | 0 |
|  | CD9038 | 0 | 0 | 0 | 13.01 | 0 | 0 | 0 |
|  | SR494 | 0 | 0 | 0 | 0 | 13.01 | 0 | 0 |
|  | SR399 | 0 | 0 | 0 | 0 | 0 | 13.01 | 0 |
| d) | PW | 20.00 | 15.00 | 15.00 | 15.00 | 15.00 | 15.00 | 15.00 |
|  | IPA | 8.01 | 0 | 0 | 3.20 | 3.25 | 5.15 | 0 |
| e) | Darocur™ 1173 | 0.50 | 0.50 | 0.50 | 0.50 | 0.50 | 0.50 | 0.50 |
| other | MEHQ | 0.50 | 0.50 | 0.50 | 0.50 | 0.50 | 0.50 | 0.50 |
|  | LiOH•$H_2O$ | 9.80 | 9.80 | 9.80 | 9.80 | 9.80 | 9.80 | 9.80 |
|  | HEAA | 0 | 0 | 0 | 0 | 0 | 0 | 13.01 |
|  | Surfactant | 1.00 | 1.00 | 1.00 | 1.00 | 1.00 | 1.00 | 1.00 |
| Results |  |  |  |  |  |  |  |  |
|  | α (%) | 92.6 | 96.7 | 96.4 | 96.1 | 96.2 | 96.1 | 94.1 |
|  | ER (ohm · $cm^2$) | 2.4 | 4.8 | 4.8 | 4.1 | 4.3 | 3.8 | 3.6 |
|  | Water permeability ($\times 10^{-12}$ $m^3/m^2$ · s · kPa) | 39.7 | 8.9 | 11.4 | 33.6 | 23.9 | 26.9 | 41.9 |

TABLE 2

| Component | name | CE 3 | Ex 6 | Ex 7 | Ex 8 | Ex 9 | Ex 10 | CE 4 |
|---|---|---|---|---|---|---|---|---|
| a) | DMAPAA-Q | 53.21 | 53.21 | 53.21 | 53.21 | 53.21 | 53.21 | 53.21 |
| b) | MBA | 9.91 | 9.91 | 9.91 | 9.91 | 9.91 | 9.91 | 9.91 |
| c) | SR259 | 0 | 13.41 | 0 | 0 | 0 | 0 | 0 |
|  | SR344 | 0 | 0 | 13.41 | 0 | 0 | 0 | 0 |
|  | CD9038 | 0 | 0 | 0 | 13.41 | 0 | 0 | 0 |
|  | SR494 | 0 | 0 | 0 | 0 | 13.41 | 0 | 0 |
|  | SR399 | 0 | 0 | 0 | 0 | 0 | 13.41 | 0 |
| d) | PW | 7.01 | 0 | 0 | 0 | 0 | 0 | 0 |
|  | IPA | 8.41 | 0 | 0 | 3.20 | 3.25 | 5.15 | 0 |
| e) | Darocur™ 173 | 0.50 | 0.50 | 0.50 | 0.50 | 0.50 | 0.50 | 0.50 |
| other | MEHQ | 0.05 | 0.05 | 0.05 | 0.05 | 0.05 | 0.05 | 0.05 |
|  | $LiNO_3$ | 19.94 | 19.94 | 19.94 | 19.94 | 19.94 | 19.94 | 19.94 |
|  | HEAA | 0 | 0 | 0 | 0 | 0 | 0 | 13.41 |
|  | Surfactant | 1.00 | 1.00 | 1.00 | 1.00 | 1.00 | 1.00 | 1.00 |
| Results |  |  |  |  |  |  |  |  |
|  | α (%) | 91.0 | 94.0 | 93.8 | 93.8 | 94.8 | 94.1 | 85.6 |
|  | ER (ohm · $cm^2$) | 1.7 | 2.0 | 1.8 | 1.9 | 2.3 | 2.1 | 2.1 |

TABLE 2-continued

| Component | name | CE 3 | Ex 6 | Ex 7 | Ex 8 | Ex 9 | Ex 10 | CE 4 |
|---|---|---|---|---|---|---|---|---|
| | Water permeation ($\times 10^{-12}$ m$^3$/m$^2 \cdot$ s $\cdot$ kPa) | 17.5 | 9.2 | 11.4 | 20.3 | 14.4 | 16.1 | 33.3 |

TABLE 3

| Component | Name | CE 5 | CE 6 | Ex 11 | Ex 12 | Ex 13 |
|---|---|---|---|---|---|---|
| a) | DMAPAA-Q | 53.12 | 35.41 | 53.12 | 35.41 | 44.37 |
| b) | MBA | 10.02 | 20.05 | 10.02 | 20.05 | 15.03 |
| c) | SR259 | 0 | 0 | 14.00 | 14.00 | 8.00 |
| d) | PW | 0 | 3.80 | 2.00 | 3.80 | 9.78 |
| | IPA | 16.00 | 16.00 | 0 | 2.00 | 0 |
| e) | Darocur™ 1173 | 0.50 | 0.50 | 0.50 | 0.50 | 0.50 |
| Other | MEHQ | 0.05 | 0.05 | 0.05 | 0.05 | 0.05 |
| | LiNO$_3$ | 19.31 | 23.19 | 19.31 | 23.19 | 21.27 |
| | Surfactant | 1.00 | 1.00 | 1.00 | 1.00 | 1.00 |
| Results | | | | | | |
| | α (%) | 91.2 | 91.1 | 93.9 | 95.3 | 95.4 |
| | ER (ohm $\cdot$ cm$^2$) | 1.2 | 2.6 | 2.2 | 6.5 | 3.2 |
| | Water permeation ($\times 10^{-12}$ m$^3$/m$^2 \cdot$ s $\cdot$ kPa) | 22.5 | 11.1 | 12.2 | 9.4 | 11.1 |

TABLE 4

| Component | ingredient | CE 7 | CE 8 | CE 9 | Ex 14 | Ex 15 | Ex 16 | Ex 17 | Ex 18 |
|---|---|---|---|---|---|---|---|---|---|
| a) | AMPS | 49.10 | 47.80 | 42.76 | 42.76 | 49.10 | 47.80 | 49.10 | 47.80 |
| b) | MBA | 11.58 | 13.08 | 16.11 | 16.11 | 11.58 | 13.08 | 11.58 | 13.08 |
| c) | SR259 | 0 | 0 | 0 | 4.00 | 8.01 | 8.01 | 13.01 | 16.01 |
| d) | PW | 20.00 | 20.00 | 15.00 | 15.00 | 20.00 | 20.00 | 15.00 | 12.00 |
| | IPA | 8.01 | 8.01 | 15.60 | 12.00 | 0 | 0 | 0 | 0 |
| e) | Darocur™ 1173 | 0.50 | 0.50 | 0.50 | 0.50 | 0.50 | 0.50 | 0.50 | 0.50 |
| Other | MEHQ | 0.50 | 0.50 | 0.50 | 0.50 | 0.50 | 0.50 | 0.50 | 0.50 |
| | LiOH$\cdot$H$_2$O | 9.80 | 9.50 | 8.50 | 8.50 | 9.80 | 9.50 | 9.80 | 9.50 |
| | Surfactant | 1.00 | 1.00 | 1.00 | 1.00 | 1.00 | 1.00 | 1.00 | 1.00 |
| Results | | | | | | | | | |
| | α (%) | 92.6 | 93.1 | 93.6 | 94.6 | 94.4 | 95.2 | 95.6 | 96.6 |
| | ER (ohm $\cdot$ cm$^2$) | 2.4 | 2.6 | 3.5 | 4.7 | 4.0 | 4.2 | 6.2 | 7.0 |
| | Water permeation ($\times 10^{-12}$ m$^3$/m$^2 \cdot$ s $\cdot$ kPa) | 39.7 | 31.9 | 29.2 | 22.2 | 16.1 | 13.9 | 8.9 | 7.5 |

TABLE 5

| Component | Name | CE 10 | CE 11 | Ex 19 |
|---|---|---|---|---|
| a) | DMAPAA-Q | 35.41 | 35.41 | 39.34 |
| b) | MBA | 20.05 | 10.00 | 11.11 |
| | BAP | 0 | 10.05 | 0 |
| c) | SR259 | 0 | 0 | 11.17 |
| d) | PW | 3.80 | 3.80 | 4.22 |
| | IPA | 16.00 | 16.00 | 6.67 |
| e) | Darocur™ 1173 | 0.50 | 0.50 | 0.56 |
| Other | MEHQ | 0.05 | 0.05 | 0.05 |
| | LiNO$_3$ | 23.19 | 23.19 | 25.77 |
| | Surfactant | 1.00 | 1.00 | 1.11 |
| Results | | | | |
| | α (%) | 90.0 | 90.3 | 93.0 |
| | ER (ohm $\cdot$ cm$^2$) | 2.7 | 2.7 | 3.2 |
| | Water permeation ($\times 10^{-12}$ m$^3$/m$^2 \cdot$ s $\cdot$ kPa) | 18.3 | 23.1 | 14.4 |

As can be seen from Table 5, Example 19 according to the invention had higher permselectivity and lower water-permeation than Comparative Examples 10 and 11.

The invention claimed is:

1. A process for preparing a membrane comprising applying a curable composition to a porous support and curing the curable composition, wherein the curable composition comprises:
   a) a curable ionic compound;
   b) a first crosslinking agent comprising at least two acrylate groups or at least two acrylamide groups;
   c) a second crosslinking agent comprising at least two acrylic groups;
   d) an inert solvent; and
   e) optionally a free radical initiator;
wherein (i) the melting point of the first crosslinking agent is 80° C., below 80° C., or above 80° C.; (ii) the second crosslinking agent has a melting point below 80° C.; (iii) the second crosslinking agent is not the same as the first crosslinking agent; (iv) the curable composition comprises 3 to 35 wt % of the first crosslinking agent and 2 to 25 wt % of the second crosslinking agent; and (v) the total amount of crosslinking agents is at least 17 wt %; wherein the amounts are based on the total weight of the curable composition.

2. The process according to claim 1 wherein the first crosslinking agent comprises at least two acrylamide groups.

3. The process according to claim 1 wherein the curable ionic compound comprises an acrylamide group.

4. The process according to claim 1 wherein the curable ionic compound comprises an ionic group selected from quaternary ammonium, sulpho, phosphato and carboxy.

5. The process according to claim 1 wherein the curable composition comprises less than 25 wt % of component d).

6. The process according to claim 1 wherein the curable composition further comprises f) a non-curable salt.

7. The process according to claim 6 wherein the non-curable salt is selected from lithium chloride, lithium bromide, lithium nitrate, lithium iodide, lithium chlorate, lithium thiocyanate, lithium hydroxide, ammonium thiocyanate, ammonium chloride, ammonium iodide, ammonium nitrate, sodium chloride, sodium bromide, sodium nitrate, sodium thiocyanate, calcium nitrate, calcium thiocyanate, calcium bromide, magnesium chloride, magnesium bromide, magnesium nitrate, magnesium thiocyanate, potassium thiocyanate, potassium chlorate, and mixtures comprising two or more such salts.

8. The process according to claim 1 wherein the inert solvent comprises less than 30 wt % inert organic solvent and the remaining inert solvent is water.

9. The process according to claim 1 wherein the curable composition comprises:
   1) 20 to 80 wt % of curable ionic compound(s);
   2) 17 to 60 wt % of crosslinking agents; and
   3) 5 to 45 wt % of inert solvent(s).

10. The process according to claim 1 wherein:
   (i) the first crosslinking agent comprises at least two acrylamide groups;
   (ii) the curable composition comprises less than 25 wt % of component d)
   (iii) optionally the curable composition further comprises an inorganic salt; and
   (iv) optionally the inert solvent comprises less than 30 wt % inert organic solvent and any remaining inert solvent is water.

11. The process according to claim 1 wherein the curable composition is cured using ultraviolet light.

12. The process according to claim 1 wherein:
   (i) the first crosslinking agent comprises at least two acrylamide groups;
   (ii) the curable ionic compound comprises an acrylamide group; and
   (iii) the curable composition comprises less than 25 wt % of component d).

13. The process according to claim 1 wherein the curable composition comprises 5 to 25 wt % of the first crosslinking agent and 3 to 20 wt % of the second crosslinking agent.

14. The process according to claim 1 wherein the curable composition comprises:
   i) 20 to 80 wt % of the curable ionic compound;
   ii) 5 to 45 wt % of the inert solvent;
   iii) 0 to 10 wt % of the free radical initiator; and
   iv) 0 to 50 wt % of a non-curable salt.

15. A membrane obtained by the process according to claim 1.

16. The membrane obtained by the process according to claim 10.

17. A membrane obtained by the process according to claim 14.

18. An electrodialysis or reverse electrodialysis unit, an electrodeionization module, a continuous electrodeionization module, a flow through capacitor, a fuel cell, a diffusion dialysis apparatus, a membrane distillation module or a membrane electrode assembly, comprising one or more membranes according to claim 15.

19. An electrodialysis or reverse electrodialysis unit, an electrodeionization module, a continuous electrodeionization module, a flow through capacitor, a fuel cell, a diffusion dialysis apparatus, a membrane distillation module or a membrane electrode assembly, comprising one or more membranes according to claim 16.

* * * * *